April 18, 1939.  H. CHIBNIK  2,154,973
PLOW
Filed Sept. 15, 1937  2 Sheets-Sheet 2
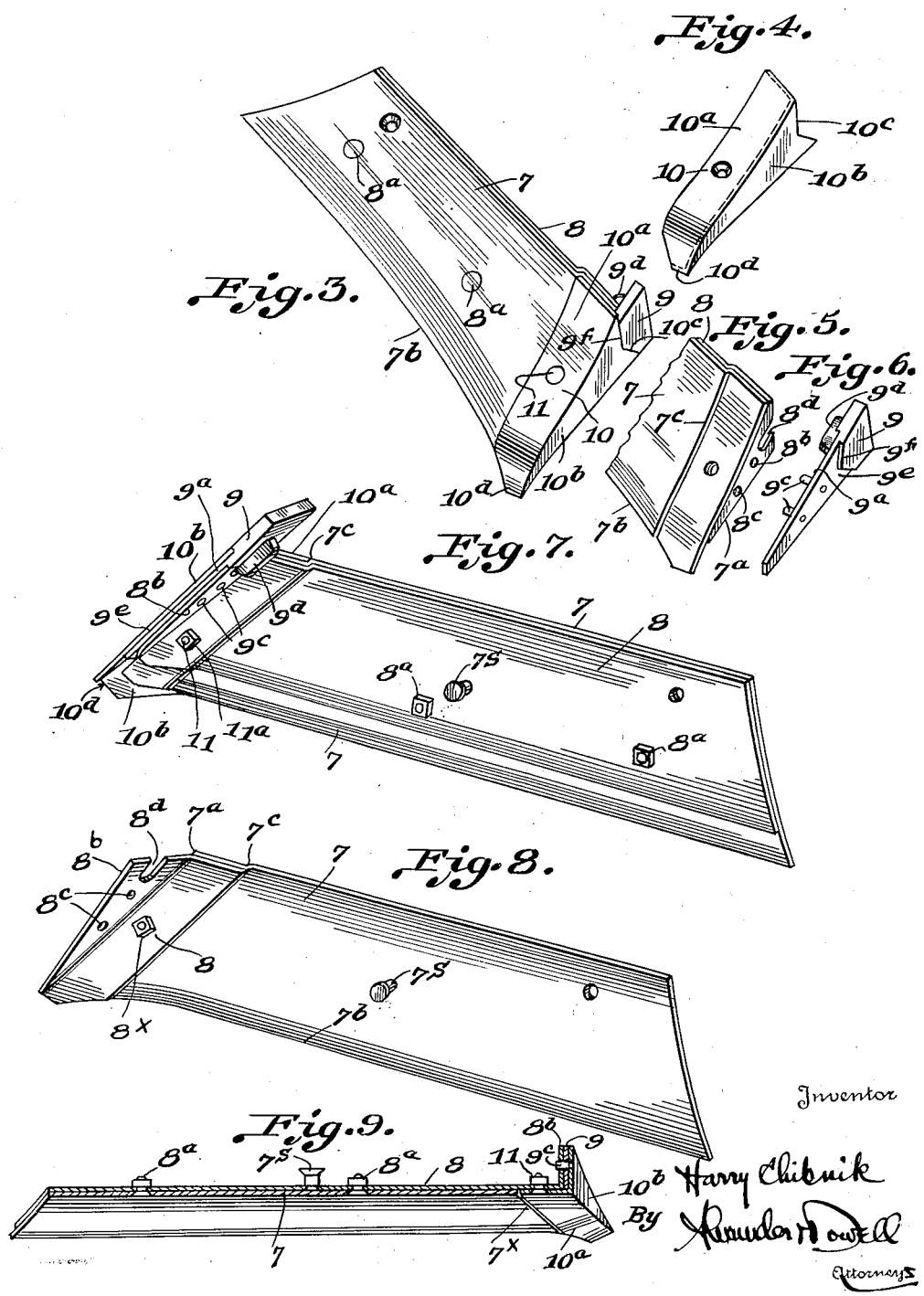

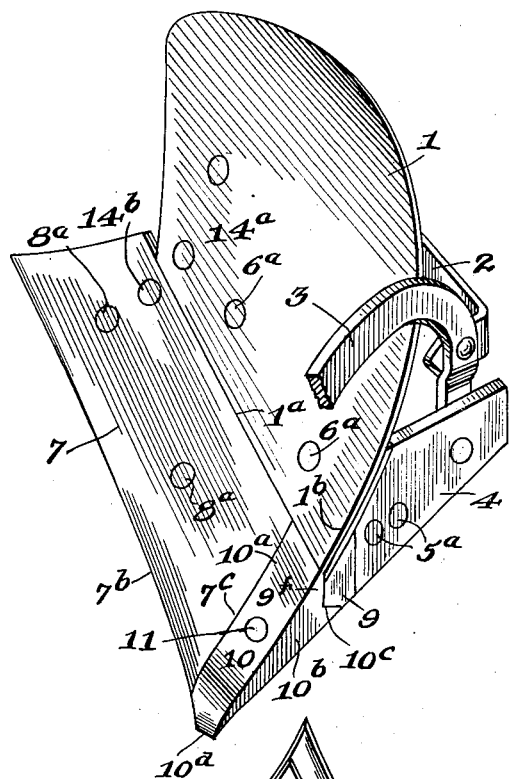

Patented Apr. 18, 1939

2,154,973

UNITED STATES PATENT OFFICE 2,154,973

PLOW

Harry Chibnik, Sioux Falls, S. Dak.

Application September 15, 1937, Serial No. 164,052

16 Claims. (Cl. 97—113)

This invention relates to agricultural plows for turning the soil, and the principal objects thereof are to provide a plow having a novel replaceable plowshare formed of thin tough steel having a beveled cutting edge which will be maintained constantly sharpened by the abrading action of the soil, said plowshare being provided with separable frogs interchangeable to suit the land sides of different makes of plows, and said plowshare being provided with novel quick removable means for mounting same on the mold board; also to provide a novel L-shaped replaceable plowpoint member having its faces inset so as to be flush with the faces of the plowshare and landside in order to promote proper scouring, said point being removably mounted on the plowshare.

Other minor objects of the invention will be hereinafter set forth.

I will explain the invention with reference to the accompanying drawings which illustrate several practical embodiments thereof to enable others to adopt and use the same; and will summarize in the claims the novel features of construction, and novel combinations of parts, for which protection is desired.

In said drawings:—

Fig. 1 is a front perspective view of a plow provided with my novel removable plowshare and removable plowpoint member.

Fig. 2 is a rear perspective view thereof showing the connection of the plowshare to the mold board.

Fig. 3 is a front perspective view of one form of my plowshare, detached, showing the point member and frog mounted thereon.

Fig. 4 is a front perspective view of the plowpoint member shown in Fig. 3, detached.

Fig. 5 is a front perspective view of the end of the plowshare shown in Fig. 3 with the point member and frog removed.

Fig. 6 is a front perspective view of the frog for the share shown in Fig. 5 detached.

Fig. 7 is a rear perspective view of the plowshare shown in Fig. 3 with the point member and frog mounted thereon.

Fig. 8 is a rear perspective view of a modified plowshare.

Fig. 9 is a section through a further modified plowshare with the point member and frog mounted thereon.

As shown, the plow preferably comprises a mold board 1 connected by a bracket 2 to the plow beam 3, the rear end of which is rounded downwardly and secured to the landside 4. Landside 4 carries an extension 5 which latter is riveted as at 5a to the inner face of the landside 4 and projects beyond the front end thereof for the purpose hereinafter explained. Extension 5 is formed integrally with a backing plate 6 secured to the rear face of the mold board 1 by bolts or rivets 6a, the lower edge 6b of the plate 6 extending below the lower edge 1a of the mold board to form a support for the plowshare 7—8.

The plowshare shown in detail in Figs. 3-7 inclusive is preferably of substantially rectangular shape and is preferably slightly concave to conform with the curvature of the mold board, and comprises a plate 7 of thin sheet steel having an edge 7a (Fig. 5) in alignment with the point edge 1b (Fig. 1) of the mold board. Said plate 7 is of length to extend somewhat beyond the outer edge of the mold board 1, and its lower cutting edge 7b is beveled on its rear face so that the abrading action of the soil, when in operation, will maintain the thin edge constantly sharpened.

Plate 7 is provided with a reinforcing backing plate 8 of less depth than the plate 7, said plate 8 being secured to the rear face of the plate 7 by bolts or rivets 8a. Backing plate 8 is preferably made of same steel as plate 7 and conforms generally with the shape thereof, and if desired may have horizontal or vertical ribs (not shown) rolled therein for stiffening purposes. At the point edge of plate 8 is a substantially V-shaped flange 8b (Fig. 5) the upper edge of which slightly overlaps the lower end of the outer face of the landside extension member 5 as shown in Fig. 2 and is of substantially the same width as the end thereof, the flange 8b narrowing towards the point of the plow.

In the flange 8a are one or more spaced holes 8c (Fig. 5) and in its upper edge is an elongated slot 8d registering with a slot 5b (Fig. 2) adjacent the lower end of the extension 5 for receiving corresponding studs on the inner face of an interchangeable frog 9 (Fig. 6) hereinafter described which overlies flange 8b.

Frog 9 is substantially V-shaped and extends from the point of the plow over the flange 8b, and overlaps the extension 5 and its upper end abuts against the lower end of landside 4 as shown in Fig. 2, said frog being of thickness equal to that of the landside 4. The underside of the frog is recessed as at 9a a depth equal to the thickness of flange 8b so that the frog will lie flat upon said flange 8b and upon extension 5. Projecting from the underside of frog 9 are two studs 9c adapted to engage the holes 8c of flange 8b; also an elongated stud 9d adapted to enter the registering slot and opening 8d—5b in the flange 8b and support 5, whereby the frog 9, when locked in position by the replaceable point member (hereinafter described), will securely clamp the adjacent edge of the share 7—8 to the extension 5 of the landside 4.

The provision of a separable frog 9 permits interchangeability to adapt the plow share to different types and makes of plows; and the angle between the flange 8b and member 8 may be varied to suit the angle of landside of the particular plow upon which the share is to be mounted.

Preferably plowshare 7—8 is joggled or offset as at 7c (Fig. 5) to receive the overflying flange 10a of a removable point member 10 having another flange 10b overlying the outer face of frog 9. Frog 9 has a recess 9e in its outer face of shape to suit that of flange 10b. Preferably the upper edge of flange 10b has a V-shaped notch 10c therein, and the adjacent edge of the recess 9e is V-shaped as at 9f to interlock with the notch 10c thereby assisting in maintaining the point member 10 and frog 9 in proper positions. Point 10 projects below the cutting edge of plowshare 7—8 and terminates in a hardened thickened cutting edge or point 10d. Point member 10 is maintained upon the plowshare 7—8 by means of a bolt 11 having its head countersunk in the flange 10a, said bolt passing through a hole 7d (Fig. 5) in the share 7—8 and provided with a nut 11a. As flange 10a lies flush with the outer face of plowshare 7—8, proper scouring is promoted. Ordinarily the point member 10 will wear out much quicker than plowshare 7—8, but thus in my plow the point member may be readily removed and replaced at small cost by simply removing bolt 11. The plate 7 will out-last four or five point members 10 in wear, but by removing the two bolts 8a which fasten the plate 7 to the backing plate 8, the plate 7 can be readily replaced at small cost.

In Fig. 8 a modified plowshare is shown in which the member 8 extends only along one edge of the plate 7 and is pivoted to the rear face thereof by a bolt 8x so as to be angularly adjustable thereon to suit different makes of plows. The flange 8b functions the same as in the preceding figures.

In Fig. 9 a further modified plowshare is shown in which the joggled portion 7c is omitted, the plate 7 terminating as at 7x adjacent the flange 10a of the point member, and the backing plate 8 continuing directly under the point member to the flange 8b. Since flange 10a will lie flush with the face of plate 7, however, proper scouring is promoted.

The plowshare 7—8 is secured to mold board 1 in the following manner. A stud 7s is provided on the rear of the plowshare adapted to be engaged by a hook rod or bolt 12 which passes through an eye in a bracket 13 secured to the customary bracket 2 of the plow, the bolt 12 having nuts 12a thereon at each side of bracket 13 to retain the plow share fixedly upon the mold board. A strap 14 is also provided, secured by rivets or bolts 14a to mold board 1, and a bolt 14b transfixes the strap and plowshare and assists in holding the members in proper position. Also the elongated stud 9d on the underside of frog 9, which fits within the corresponding slot 5b in the landside extension 5 assists in securely locking the plowshare 7—8 to the mold board.

I claim:

1. In an agricultural plow; a mold board; a landside having its outer face recessed adjacent the plow point; a plowshare removably secured to the mold board and having a flange overlapping the recessed portion of the landside; a replaceable frog overlying the flange and filling the recess; interengaging means carried by the frog, flange, and recessed portion; and a replaceable plow point member secured to the plow and overlying the plow share and frog.

2. In a plow as set forth in claim 1, the front face of the plowshare and outer face of the frog being recessed whereby the replaceable point member will lie flush with the faces of the plowshare and frog.

3. In a plow as set forth in claim 1, a backing plate on the mold board projecting below the lower edge thereof, said plate being bracketed to the landside; said plowshare overlying the backing plate and abutting against the lower edge of the mold board; a stud on the plowshare; a hook rod engaging the stud and passing through said bracket and carrying elements engaging the opposite faces thereof.

4. In a plow as set forth in claim 1, said interengaging means comprising holes in the flange and in the overlapping portions of the flange and recessed portion of the landside; and studs projecting from the inner face of the frog entering said holes.

5. In a plow as set forth in claim 1, said plowshare comprising a relatively thin plate having a beveled cutting edge; a backing member conforming substantially with the area of the plate and removably secured thereto, said member carrying the said flange; and said plate and member being joggled rearwardly to receive the overlying portion of the replaceable point member.

6. In a plow as set forth in claim 1, said plowshare comprising a relatively thin plate having a beveled cutting edge; a backing member conforming substantially with the area of the plate and removably secured thereto, said member carrying the said flange; and the plate terminating adjacent the edge of the replaceable point member.

7. In a plow as set forth in claim 1, said replaceable point member being L-shaped; one flange of the member overlying the plowshare, and the other flange overlying a recess in the frog; the upper edge of the frog engaging flange and the end of the recess in the frog being shaped to interlock.

8. In a plow as set forth in claim 1, said replaceable point member being L-shaped and having a hardened cutting point; one flange of the member overlying the plowshare and the other the frog; and a removable element securing the share engaging flange to the plowshare, the frog engaging flange retaining the frog in engagement with the flange and recessed portion of the landside.

9. In a plow as set forth in claim 1, said replaceable point member being L-shaped; one flange of the member overlying the plowshare and the other flange overlying a recess in the frog; the upper edge of the frog engaging flange and the end of the recess in the frog being shaped to interlock; and a removable element securing the share engaging flange to the plowshare, the frog engaging flange retaining the frog in engagement with the said flange and recessed portion of the landside.

10. In an agricultural plow, a mold board; a landside having its outer face recessed adjacent the plow point; a plowshare secured to the mold board and having a flange overlapping the recessed portion of the landside; a replaceable frog overlying the flange and filling the recess; interengaging means carried by the frog, flange, and recessed portion; a replaceable L-shaped plow point member overlying the share and frog; one flange of the member overlying a recess in the plowshare, and the other flange overlying a recess in the frog whereby the flanges will lie flush with the faces of the plowshare and landside.

11. In a plow as set forth in claim 10, a removable element securing the share engaging flange to the plowshare, the frog engaging flange retaining the frog in engagement with the said flange and recessed portion.

12. In a plow as set forth in claim 10, said interengaging means comprising holes in the flange and in the overlapping portions of the flange and recessed portion of the landside; and studs projecting from the inner face of the frog entering the holes.

13. In a plow as set forth in claim 10, the upper edge of the frog engaging flange and the end of the recess in the frog being shaped to interlock.

14. A replaceable plowpoint member for agricultural plows having a landside recessed at its end adjacent the plowpoint and having a plowshare provided with a flange overlying the recessed portion of the landside, and having a frog interlocking the flange and landside; said point member comprising an L-shaped member having a hardened cutting point; one flange of the member being adapted to overlie the plowshare and the other flange to overlie the frog; and a removable element carried by the share engaging flange adapted to secure the flange to the plowshare.

15. In a plowpoint member as set forth in claim 14, the upper edge of the frog engaging flange being shaped to interlock with the end of a recess in the outer face of the frog.

16. In a plowpoint member as set forth in claim 14, the frog engaging flange filling a recess in the outer face of the frog and being shaped to interlock in said recess whereby the said flange will retain the frog in engagement with the landside and will lie flush with frog and landside.

HARRY CHIBNIK.